United States Patent [19]

Bayne

[11] 3,979,524

[45] Sept. 7, 1976

[54] METHOD OF COLD STERILIZATION AND PRESERVATION OF FOOD PRODUCTS USING DIMETHYL DICARBONATE

[75] Inventor: Peter D. Bayne, Shorewood, Wis.

[73] Assignee: Logica International Corporation, Milwaukee, Wis.

[22] Filed: Jan. 30, 1976

[21] Appl. No.: 653,657

Related U.S. Application Data

[62] Division of Ser. No. 526,529, Nov. 25, 1974, Pat. No. 3,936,269.

[52] U.S. Cl. .................................. 426/305; 21/58; 21/60.5 A; 426/310; 426/332; 426/333; 426/335

[51] Int. Cl.² ...................... A23B 4/08; A23B 7/14; A23L 3/34; A23L 3/36

[58] Field of Search .......... 21/58, 60.5 A; 424/301; 260/463; 426/326, 331, 332, 335, 333, 323, 327, 133, 305, 310, 442, 420; 53/21 FC

[56] References Cited
UNITED STATES PATENTS

| | | | |
|---|---|---|---|
| 2,193,636 | 3/1940 | Marshall | 426/323 |
| 2,876,109 | 3/1959 | Hemery et al. | 426/310 |
| 2,910,400 | 10/1959 | Bernhard et al. | 21/58 |
| 3,186,905 | 6/1965 | Genth et al. | 424/301 |
| 3,597,235 | 8/1971 | Kramer | 21/58 |
| 3,655,719 | 4/1972 | Anderson et al. | 21/58 |

FOREIGN PATENTS OR APPLICATIONS

| | | | |
|---|---|---|---|
| 629,406 | 10/1961 | Canada | 426/327 |

*Primary Examiner*—Morris O. Wolk
*Assistant Examiner*—Bradley R. Garris
*Attorney, Agent, or Firm*—Andrus, Sceales, Starke & Sawall

[57] ABSTRACT

A method of cold sterilizing a perishable food product during shipment and storage. Liquid dimethyl dicarbonate is applied to the outer surface of the food product and the product is chilled to solidify the coating. The coating acts to protect the food product from microbiological contamination during shipment and storage and can be washed from the product prior to usage.

9 Claims, No Drawings

METHOD OF COLD STERILIZATION AND PRESERVATION OF FOOD PRODUCTS USING DIMETHYL DICARBONATE

This is a division of application Ser. No. 526,529, filed Nov. 25, 1974 now U.S. Pat. No. 3,936,269.

BACKGROUND OF THE INVENTION

Pyrocarbonic acid esters, such as diethyl pyrocarbonate have been used in the past for preserving perishable materials, such as fruit juices, vegetable products, wine, pharmaceutical products, beer, and the like, and have the advantage of decomposing into materials native to the perishable material. Dimethyl dicarbonate is more microbiologically active than diethyl dicarbonate and has a greater water solubility, but is less stable in liquid form than diethyl dicarbonate. It has been found that about 10% of dimethyl dicarbonate will autohydrolyze when stored in the liquid state over a period of about 36 hours at room temperature. Because of the lack of stability, dimethyl dicarbonate has shown little commercial promise as a cold sterilizing agent, even though it has greater microbiological activity than its homolog, diethyl dicarbonate.

SUMMARY OF THE INVENTION

The invention relates to a method of sterilizing a perishable material, such as a beverage, or food product, by use of dimethyl dicarbonate. In accordance with the invention, the dimethyl dicarbonate is frozen immediately after synthesis by subjecting it to a temperature below 16°C. In the frozen state, the dimethyl dicarbonate can be handled, stored, and transported without loss of its microbiological activity.

At the time of use, the dimethyl dicarbonate is heated to a temperature above 16°C under an inert atmosphere to liquify the material, and the liquid is immediately introduced and dissolved within the perishable product. If the product is at a temperature below the freezing point of the dimethyl dicarbonate the dimethyl dicarbonate will not crystalyze or freeze, but will dissolve in the liquid product, provided that the dimethyl dicarbonate conveying conduit is kept above 16°C prior to contacting the perishable product.

After solution, the product is packaged in a sealed container, such as a bottle or can, and is immediately heated to a temperature of 25° to 50°C, and the heating provides a substantial increase in the microbiological activity of the dimethyl dicarbonate, thereby assuring complete sterilization of the microorganisms in the product. Subsequently, the product is cooled, either naturally or through refrigeration, to room temperature for storage or shipment.

The method of the invention enables dimethyl dicarbonate, which has greater microbiological activity than its homologs, to be employed in a commercial cold sterilization process. By handling and storing the dimethyl dicarbonate in a frozen state its antimicrobial activity will be retained. Liquifying the material at the time of use by heating under an inert atmosphere, retains the integrity of the material so that its full antimicrobial effect can be realized. By heating the treated product after the addition of the dimethyl dicarbonate, a further increase in anti-microbial activity can be achieved, which results in a lesser amount of the dimethyl dicarbonate being required for a given cold sterilization operation.

DESCRIPTION OF THE PREFERRED EMBODIMENT

Dimethyl dicarbonate (dimethyl pyrocarbonate) has the following chemical structure:

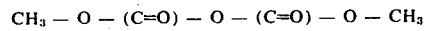

$CH_3 - O - (C=O) - O - (C=O) - O - CH_3$

The material has a molecular weight of 134.09, a boiling point at 3.5 mm of mercury of 49°C and a melting point of 16°C.

In non-alcoholic systems, dimethyl dicarbonate will hydrolyze to form carbon dioxide and methyl alcohol, while in alcoholic systems it decomposes to form carbon dioxide, methanol and ethyl methyl carbonate.

Dimethyl dicarbonate can be produced by the reaction of sodium methyl carbonate with methyl chloroformate (Chem. Abst. 47, 8109g, 1953), or alternately, by treating p-toluene sulfonyl chloride with sodium methyl carbonate (L. Rosnati, Chem. Ber, 96, 3098, 1963).

In accordance with the invention, dimethyl dicarbonate is employed to preserve or sterilize perishable materials, including beverages, such as beer, ale, wine, and soft drinks; food products, such as fruit juices, ketchup, pickles, relish and vegetables; pharmaceutical products; and the like. In carrying out the method, the dimethyl dicarbonate is immediately frozen after synthesis by chilling the material to a temperature below 16°C, and preferably in the range of −10° to 15°C. It is preferred to pour the liquid dimethyl dicarbonate into small polyethylene containers which are then covered and hermetically sealed as by plastic shrink wrapping. On solidification, the material will be in the form of solid bricks or slabs. However, it is contemplated that the dimethyl dicarbonate can also be frozen in the form of granules, flakes, sheets, or the like. In the frozen form the dimethyl dicarbonate can be handled, stored and transported without losing its microbiological activity.

At the time of use, the dimethyl dicarbonate is liquified by heating the material to a temperature above 16°C, generally in the range of 17° to 40°C, under an inert atmosphere. More specifically, the bricks or slabs of dimethyl dicarbonate are removed from their containers, placed in sealed dispensing containers and are introduced into a water-jacketed vessel to heat the dimethyl dicarbonate to a temperature within the abovementioned range. The inert atmosphere can be provided by introducing dry nitrogen, or other inert gases, into the head space of the vessel to prevent decomposition of the dimethyl dicarbonate during the liquification.

Following the liquification, the dimethyl dicarbonate is introduced into the perishable product while maintaining the dimethyl dicarbonate under the inert atmosphere. In most cases the perishable product will be at a temperature of −5° to 13°C when the dimethyl dicarbonate is added, although in some cases the product may be at a temperature up to 40°C. On a commercial basis, it is preferred to admix the dimethyl dicarbonate with the perishable product through use of an injection machine, such as that described in U.S. Pat. No. 3,506,460. The liquid dimethyl dicarbonate is injected into the flow stream of the perishable product and is homogenized to thoroughly blend the dimethyl dicarbonate into the product. In other cases, the dimethyl dicarbonate can be added to a batch of the perishable product and blended therein by mechanical agitating equipment, while maintaining the inert atmosphere.

If the product is at a temperature which is below the freezing point of the dimethyl dicarbonate, the dimethyl dicarbonate will not crystalyze or freeze, when incorporated with the product, but instead will be dissolved in the aqueous phase of the product.

The dimethyl dicarbonate is added to the product in an amount to achieve sterilization which generally is from 1 to 1000 ppm, and preferably from 25 to 200 ppm.

After the introduction of the liquid dimethyl dicarbonate, the product is preferably heated to a temperature at least 10°C above the temperature of the product at the time the dimethyl dicarbonate was introduced, but not exceeding 50°C to increase the anti-microbial activity of the sterilant. In the case of a product at a temperature above 20°C when the dimethyl dicarbonate was added, additional heating is not required and the product can be maintained at this temperature. It has been found that by subjecting the dimethyl dicarbonate to a temperature in this range either just before packaging in sealed containers, such as bottles or cans, or after packaging, the activity can be increased in an amount of 20% to 100%. This results in a lesser amount of the sterilant being required to provide a given sterilization effect.

The product is heated to this elevated temperature range within thirty minutes following the incorporation of the liquid dimethyl dicarbonate into the product, and preferably within five minutes after the incorporation. The product, depending upon its nature, is held at the elevated temperature for a period of up to 24 hours, and may be subsequently cooled to room temperature for storage or shipment.

In alcoholic systems, such as beer or wine, the dimethyl dicarbonate will hydrolyze to form carbon dioxide, methanol and ethyl methyl carbonate, while in non-alcoholic systems, carbon dioxide and methanol are formed. The decomposition products are naturally occurring in the perishable material, and the contribution of methanol is well below the amount of methanol naturally present in food products.

The method of the invention enables dimethyl dicarbonate to be used as a cold sterilant in commercial applications, thereby utilizing its greater anti-microbial activity. By storing and transporting dimethyl dicarbonate in the solid state at temperatures below 16°C, there is no danger of decomposition and the effectiveness of the dimethyl dicarbonate will be retained until the time of use. Furthermore freezing prevents the development of objectionable vapors which could irritate the skin and eyes. Heating the packaged product will act to substantially increase the anti-microbial effectiveness of the dimethyl dicarbonate, enabling lesser quantities of the dimethyl dicarbonate to be used for complete sterilization.

The invention has particular use in stabilizing the cloud of freshly extracted citrus fruit juice, such as orange, lemon, lime, grapefruit, and tangerine juice. The liquified dimethyl dicarbonate is added as a cold sterilant to the juice along with a proteolytic enzyme, such as ficin, papain, or bromelin, and a pectinase having a high level of polygalacturonase. In stabilizing the cloud, the dimethyl dicarbonate, the proteolytic enzyme and the pectinase are added generally in a proportion of 1.5:1.0:0.5 parts per 5,000 parts of the citrus fruit juice.

Perishable food products can also be protected by coating the outer surface of the product with a film of dimethyl dicarbonate and then freezing the film. This treatment can be applied to meat, such as beef, pork and ham; poultry, such as chicken or turkey; fresh fruit, such as oranges, apples or pineapple; and the like. The liquid dimethyl dicarbonate at a temperature above 16°C can be applied to the surface of the product by dipping or spraying, and the coated product is then subjected to a temperature below 16°C to solidify the coating. By maintaining the temperature of the product slightly below 16°C, the coating will protect the food product against spoilage during shipment without resorting to freezing of the product, extensive refrigeration, or the use of persistent chemical preservatives, such as biphenyl. The protective film can be washed from the product prior to usage.

In this type of sterilization process, the dimethyl dicarbonate can be used in a pure, concentrated form, or it can be used as a solvent solution in which a solvent, such as fluorocarbon (Freon C318 or Freon 51-12) or halogenated hydrocarbons, having a boiling point below the boiling point of dimethyl dicarbonate is flashed off by heating, after application of the coating and before freezing of the dimethyl dicarbonate.

The following examples illustrate the method of the invention:

EXAMPLE I

Liquid dimethyl dicarbonate immediately after synthesis was poured into a polyethylene tray having a size of 18 × 12 × 6 inches and cooled to a temperature of 1°C to freeze the dimethyl dicarbonate. At the time of use, the dimethyl dicarbonate was placed in a 3 gallon stainless steel sealed vessel which was placed in a water-jacketed heating tank and heated at a temperature of 20°C to liquify the dimethyl dicarbonate while maintaining the dimethyl dicarbonate under a dry nitrogen gas atmosphere in the sealed vessel. The liquified dimethyl dicarbonate was then pumped to an injection machine of the type disclosed in U.S. Pat. No. 3,506,460, and introduced into the flow stream of wine in an amount of 50 ppm. The wine was then bottled and immediately heated to a temperature of 37°C to increase the activity of the dimethyl dicarbonate. The bottled wine was maintained at this temperature for 60 minutes, and was subsequently cooled to a room temperature of 18°C.

EXAMPLE II

After synthesis of dimethyl dicarbonate, the liquid at 20°C was poured into polyethylene trays in such a manner that each tray contained one pound of the substance. The trays were then frozen at 10°C while a liquid sample of dimethyl dicarbonate was retained as a control. After freezing, the tray was covered with a plastic lid and the unit sealed with a plastic sleeve which fit over the lid and tray and then was affixed to the unit by heat shrinking in a mild heat tunnel.

Three one-pound trays were stacked into a polyurethane foamed box selected for its insulating properties and, after adding a small amount of dry ice, the box was sealed and shipped 1400 miles by air. At the same time, the control sample was shipped at room temperature with no further treatment. At their destination, the frozen and liquid samples were analyzed for purity by the method of Johnson and Funk (Anal. Chem, 27, 1464, 1955). The frozen sample after 36 hours in the frozen state analyzed at its original purity of 99.1% within experimental error. However, the liquid sample shipped at room temperature had decomposed from the original purity to 87.3% with resultant loss of activity.

EXAMPLE III

A one pound frozen sample, frozen as described in Example II, was placed in a 5 gallon stainless pressure tank by expelling the frozen block by pressure on the bottom of the tray and dropping the block in the bottom of the pressure tank. The tank was then sealed and pressurized to 50 psi, with dry nitrogen gas. The pressure tank was then placed in the 20°C water bath.

The pressure tank was then connected to an injection machine and the thawed dimethyl dicarbonate was introduced into an orange drink composed of reconstituted orange juice, water, citric acid, sodium citrate, various orange essential oils and flavorings, and sucrose. The orange drink was pumped at 10°C to the bottling line filler where just prior to filling, dimethyl dicarbonate was introduced at the level of 200 ppm. After sealing the glass bottles, the bottles were warmed to 35°C in a hot water spray warmer, labelled and then cased. In the case, the bottles cooled to room temperature in about 18 hours. Although orange drink is an excellent medium for microbiological growth due to its high sucrose and growth factor content, the samples treated did not exhibit any manifestations of microbiological activity, both by plating and by storage for 60 days. Control untreated samples of the orange drink, however, spoiled within four days after bottling as evidenced by gas development and sour off-flavors. Plating indicated gross contamination with wild yeasts and bacteria.

EXAMPLE IV

Single strength juice, comprising a blend of reconstituted concentrated and freshly extracted juice, was treated according to U.S. Pat. No. 3,754,932, so as to stabilize the cloud without the addition of heat. Dimethyl dicarbonate, prepared in the manner of Examples II and III, was injected into the juice at the level of 300 ppm. with the juice at 1°C just prior to filling. After filling, the sealed cans of treated juice were then heated to 30°C and allowed to cool to ambient temperatures before being shipped 24 hrs. later. The treated samples were examined 14 days after packaging and were found to be sterile.

Control samples of identical untreated juice, however, spoiled within 72 hrs. after filling, as shown by gas formation and acidic off-flavors.

EXAMPLE V

Lager beer at a temperature of 1°C, comprising a formulation of 60% malt and 40% adjunct with an alcohol content of 3.8 percent by weight was treated just prior to filling with dimethyl dicarbonate at the level of 50 ppm. The beer was warmed to 30°C before shipment and the treated sample was sterile after storage at 20°C for 90 days, while untreated controls developed bacterial growth in 30 days as indicated by turbidity and the formation of diacetyl under the same storage conditions.

EXAMPLE VI

Freshly extracted, filtered, apple juice, was sterile filtered and heated to 30°C and then treated with 75 ppm. dimethyl dicarbonate prior to bottling. The bottles were sealed and then allowed to cool to ambient temperatures prior to shipment. The treated samples were examined after 120 days of storage at 20°C and were found to be sterile. Untreated samples, however, after 100 days developed mold growth around the neck of the beverageheadspace interface. Such contamination developed during the filling process of the untreated juice in spite of the sterile filtration step.

EXAMPLE VII

A pickle relish batch was heated to 40°C and held in the packaging tank. The relish was then introduced to the filler by means of a gravity feed system. Dimethyl dicarbonate was introduced at the level of 200 ppm. just prior to filling. After filling, the relish bottles were sealed and allowed to cool down to ambient temperatures before shipment. The treated samples were stored at 20°C for 120 days and examined microbiologically and were found to be sterile. Untreated relish packages developed bacterial ropiness, and mold within 90 days.

EXAMPLE VIII

A large rectangular 500 gallon stainless steel tank was filled with a mixture of Freon and dimethyl dicarbonate so that the dimethyl dicarbonate level was approximately 1%. A stainless steel, chicken carcass conveying system was designed so that the chicken carcasses, prior to packaging, were momentarily dipped into the dimethyl dicarbonate solution. A residual film of dimethyl dicarbonate completely coated the surface of the chicken carcass after the Freon has been vaporized. The coating of dimethyl dicarbonate was then solidified by maintaining the chicken carcass below 16°C during packaging, transportation and storage prior to sale. The coating prevented microbiological growth on the surface of the chicken carcass, eliminating spoilage and the development of off-odors and flavors. Just prior to cooking, the dimethyl dicarbonate is removed by washing the surface of the chicken with water. Any residue of dimethyl dicarbonate would be destroyed by the cooking process due to the instability of dimethyl dicarbonate at elevated temperatures.

Various modes of carrying out the invention are contemplated as being within the scope of the following claims particularly pointing out and distinctly claiming the subject matter which is regarded as the invention.

I claim:

1. A method of cold sterilizing and preserving a perishable food product during shipment and storage, comprising the steps of applying a coating of liquid dimethyl dicarbonate to the outer surface of the food product, cooling the coating to a temperature below 16°C to solidify the coating, said coating acting to protect the food product from spoilage during shipment and storage, and thereafter washing the coating from the food product prior to usage.

2. The method of claim 1, and including the step of maintaining the coated food product at a temperature in the range of 0° to 16°C.

3. The method of claim 1, wherein the food product comprises fresh fruit.

4. The method of claim 1, wherein the food product comprises meat.

5. The method of claim 1, wherein the food product comprises poultry.

6. The method of claim 1, wherein the dimethyl dicarbonate is dissolved in a solvent having a boiling point beneath the boiling point of the dimethyl dicarbonate to form a solution, and said method includes the steps of applying the solution to said product as a coating, and heating the coating, prior to the step of cooling, to a temperature above the boiling point of the solvent and below the boiling point of said dimethyl dicarbonate to evaporate the solvent and provide a coating consisting essentially of dimethyl dicarbonate.

7. The method of claim 1, wherein the coating is applied by spraying.

8. A method of cold sterilizing and preserving a perishable food product during shipment and storage, comprising the steps of applying a coating of liquid dimethyl dicarbonate to the outer surface of the food product, cooling the coating to a temperature below the solidification temperature of dimethyl dicarbonate to solidify the coating, maintaining said coating at a temperature below said solidification temperature during shipment of said food product, and thereafter removing the coating from the food product prior to usage.

9. The method of claim 8, wherein said food product is selected from the group consisting of meat, poultry and fruit.

* * * * *